J. BERGER, JR.

SEWING MACHINE.

APPLICATION FILED NOV. 11, 1919.

Reissued Mar. 9, 1920.

14,813.

6 SHEETS—SHEET 1.

Inventor

Joseph Berger Jr.

By Shurtleff & Thomson

Attorneys

J. BERGER, Jr.

SEWING MACHINE.

APPLICATION FILED NOV. 11, 1919.

Reissued Mar. 9, 1920.

14,813.

6 SHEETS—SHEET 2.

Inventor

Joseph Berger Jr.

By Sturtevant Hueson

Attorney

J. BERGER, Jr.

SEWING MACHINE.

APPLICATION FILED NOV. 11, 1919.

Reissued Mar. 9, 1920.

14,813.

6 SHEETS—SHEET 3.

Inventor.

Joseph Berger Jr

By

Sturtevant & Russell

Attorneys

J. BERGER, JR.

SEWING MACHINE.

APPLICATION FILED NOV. 11, 1919.

Reissued Mar. 9, 1920.

14,813.

6 SHEETS—SHEET 4.

Inventor

Joseph Berger Jr

By Sturtevant & Mason

Attorneys.

J. BERGER, Jr.

SEWING MACHINE.

APPLICATION FILED NOV. 11, 1919.

Reissued Mar. 9, 1920.

14,813.

6 SHEETS—SHEET 5.

Inventor

Joseph Berger Jr

By Shurtleff Duncan

Attorney

J. BERGER, Jr.

SEWING MACHINE.

APPLICATION FILED NOV. 11, 1919.

Reissued Mar. 9, 1920.

14,813.

6 SHEETS—SHEET 6.

Inventor

Joseph Berger Jr

Sturtevant & Mason

Attorneys

UNITED STATES PATENT OFFICE.

JOSEPH BERGER, JR., OF UTICA, NEW YORK, ASSIGNOR TO UNION SPECIAL MACHINE COMPANY, OF CHICAGO, ILLINOIS, A CORPORATION OF ILLINOIS.

SEWING-MACHINE.

14,813. Specification of Reissued Letters Patent. Reissued Mar. 9, 1920.

Original No. 1,281,900, dated October 15, 1918, Serial No. 135,253, filed December 5, 1916. Application for reissue filed November 11, 1919. Serial No. 337,230.

*To all whom it may concern:*

Be it known that I, JOSEPH BERGER, JR., a citizen of the United States, residing at Utica, in the county of Oneida and State of New York, have invented certain new and useful Improvements in Sewing-Machines, of which the following is a description, reference being had to the accompanying drawings, and to the figures of reference marked thereon.

The invention relates to new and useful improvements in sewing machines, and more particularly to a sewing machine for trimming and uniting fabric sections.

An object of the invention is to provide a sewing machine of the above character wherein the edge portions of the fabric sections will be trimmed and united by stitching, and wherein the trimmed edge portions will overlap with the trimmed edges thereof terminating within the limits of the stitching mechanism, whereby both trimmed edges will be covered.

A further object of the invention is to provide such a machine which may be used for joining a collarette strip to the neck of a garment and also for shaping the collarette strip as it is stitched to the garment.

These and other objects will in part be obvious and will in part be hereinafter more fully disclosed.

In the drawings, which show by way of illustration, one embodiment of the invention:—

Figure 1:
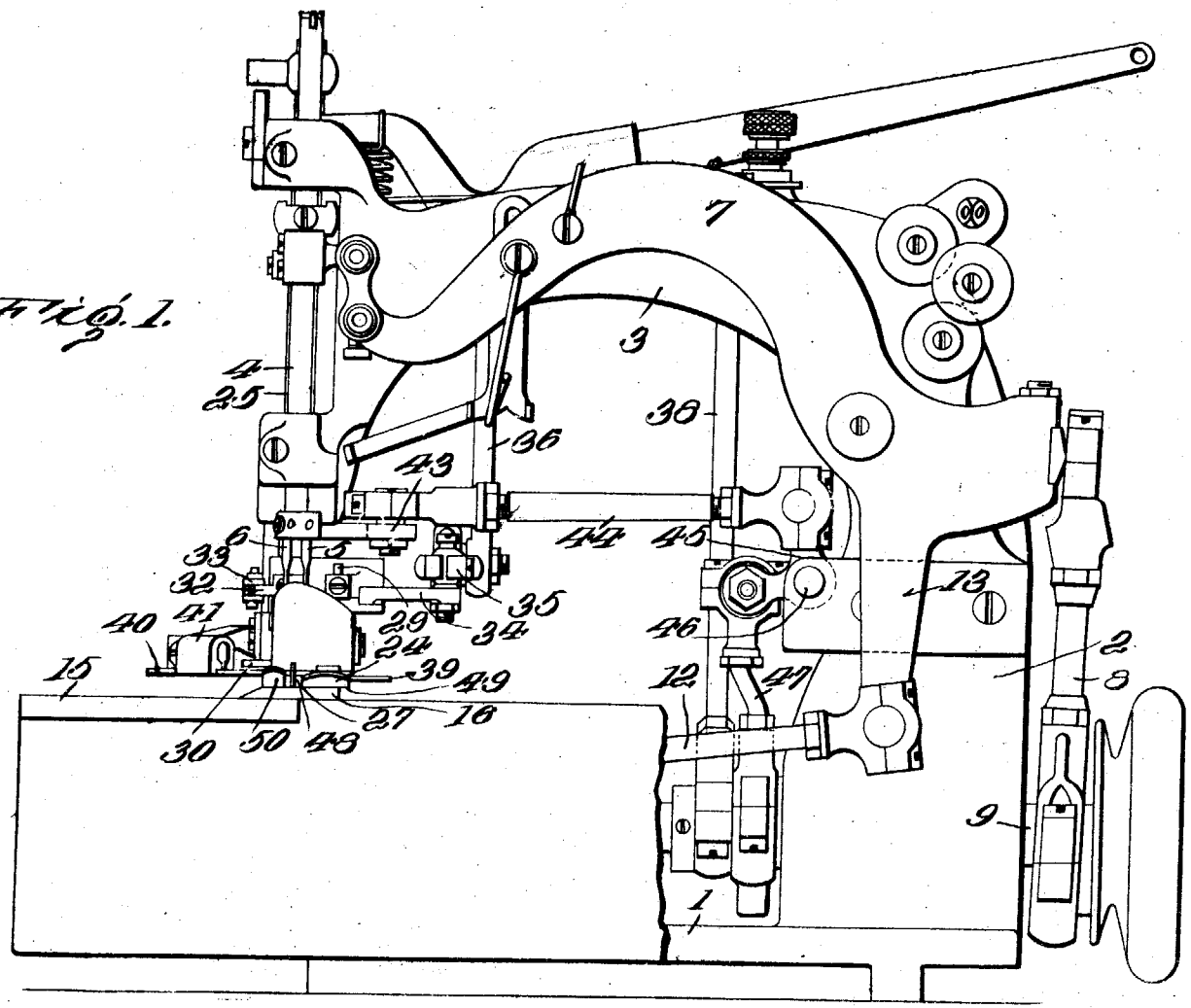
Figure 1 is a front view of a machine embodying my improvements.
Figure 2:
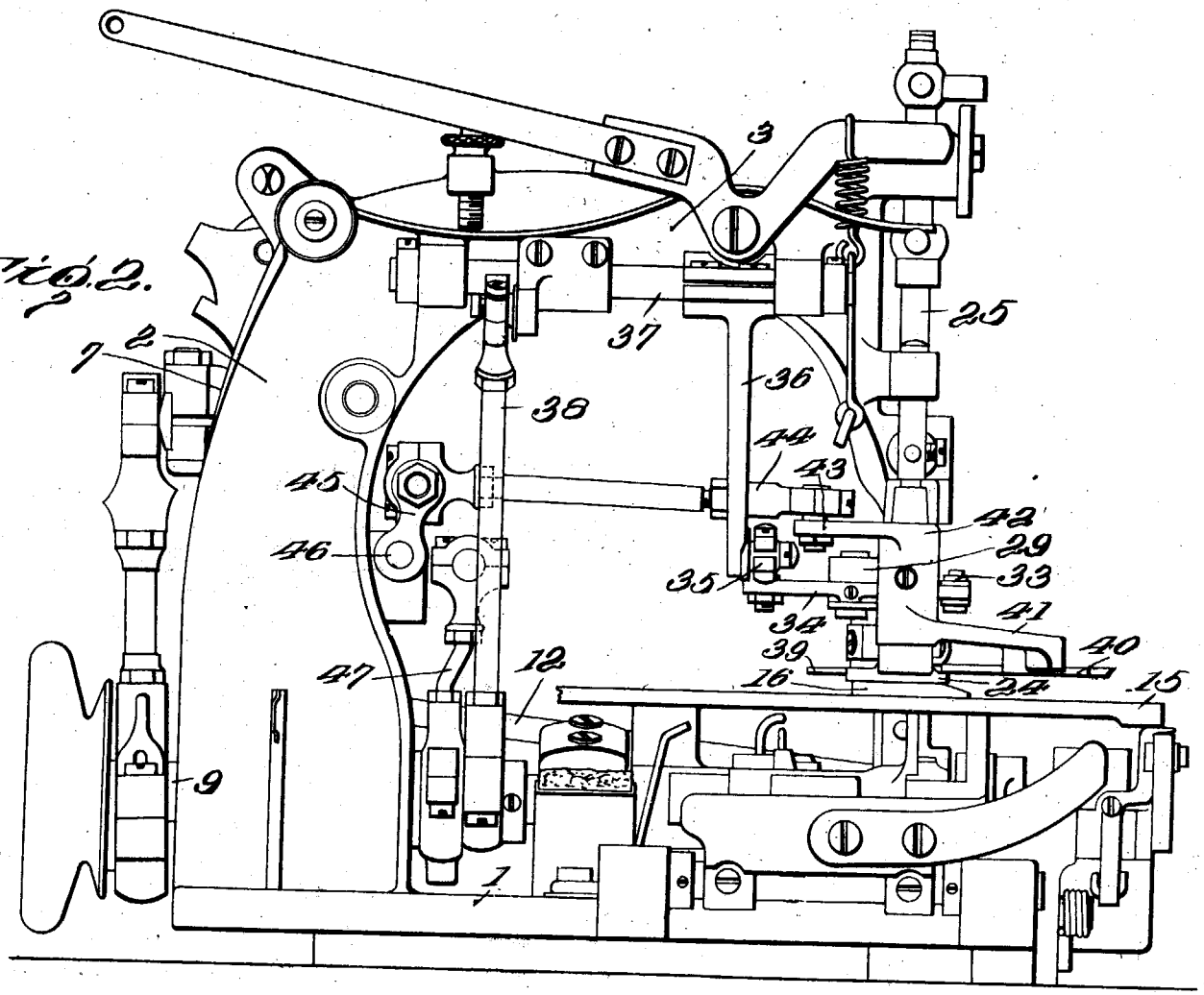
Fig. 2 is a rear view of the same.
Figure 3:
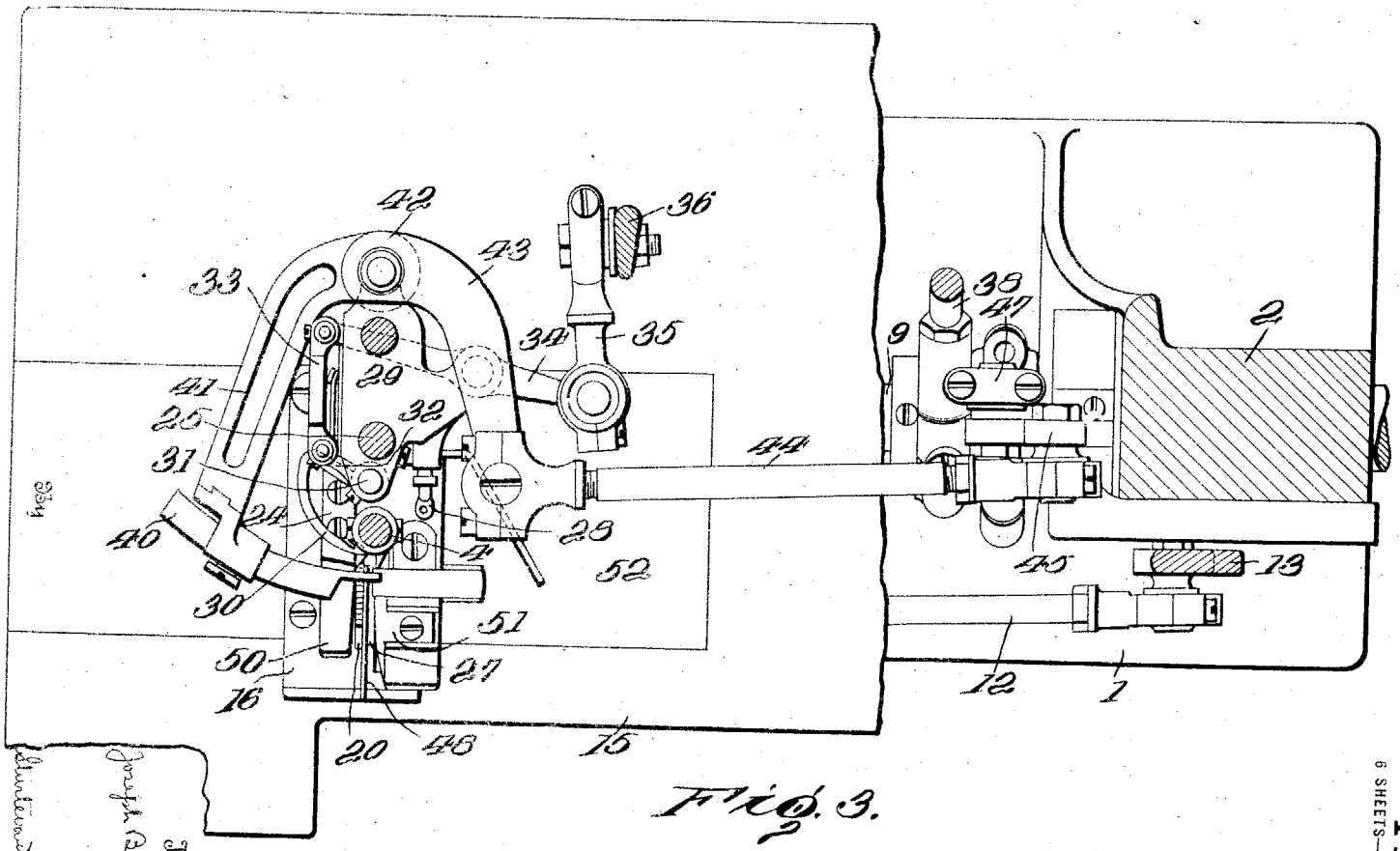
Fig. 3 is a view partly in plan and partly in horizontal section through the machine above the presser foot.
Figure 4:
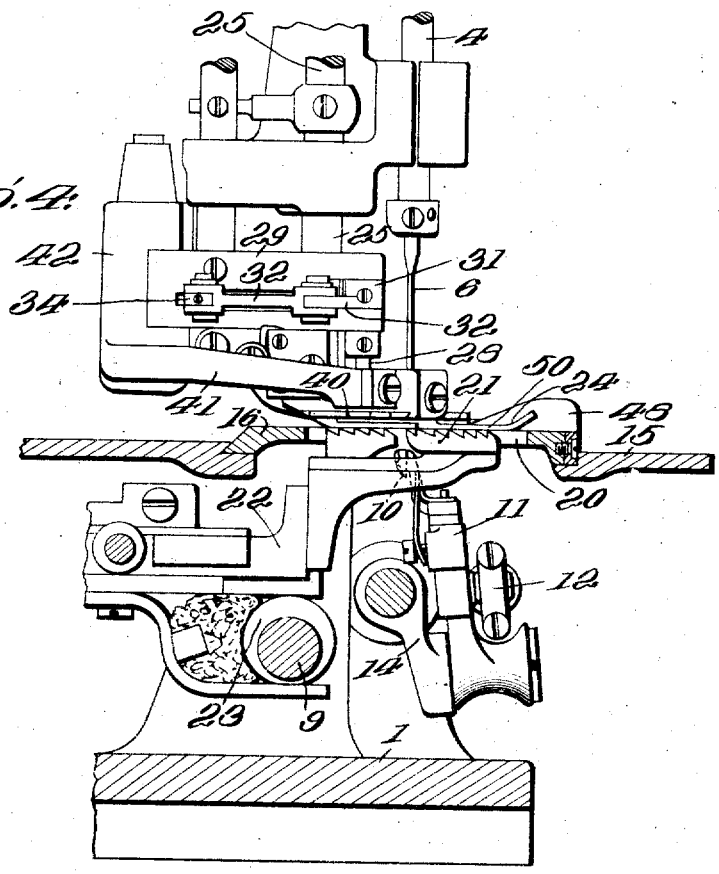
Fig. 4 is a view partly in end elevation and partly in vertical section substantially on the line of feed.

The invention is directed broadly to a sewing machine for forming a covered lapped seam, wherein the fabric sections are united by a stitching mechanism including a plurality of needles disposed in a line at an angle to the line of feed, complemental stitch forming mechanism for joining the needle thread loops beneath the work support, and a cross thread laying mechanism for joining the needle threads above the work support, and wherein the edge portions of the fabric sections are simultaneously trimmed as they are stitched and in advance of the stitching mechanism by a trimming mechanism arranged so that the trimmed edge portions will overlap with the trimmed edges thereof terminating or lying within the limits of the stitching mechanism whereby said overlapped edge portions will be joined, and both trimmed edges of said portions will be covered by the concatenated threads of the stitching mechanism. The feeding mechanism operates to feed the trimmed edge portions from the trimming mechanism past the stitching mechanism.

The stitching mechanism consists preferably of spaced needles, a cross thread laying mechanism for joining the needle threads on the upper face of the material and a looper for joining the needle threads on the lower face of the material. The material is held on the work support by a presser foot which is formed with a slot so that the edge portions to be united may be turned out of the plane of the fabric sections and led into said slot in the forward end of the presser foot. A horizontally disposed trimming mechanism located in advance of the needle, trims the upturned edges. The presser foot is provided with a guide which positively forces one of the trimmed edge portions, preferably the neck of a garment, back into its normal plane after which another guiding portion of the presser foot turns down the other edge portion, that is, the collarette strip, onto the first-named edge portion. These edge portions overlap and the trimmer is disposed a certain distance above the work support in proportion to the space between the needles so that while the edge portions overlap, they are located wholly within the limits of the stitching mechanism, and, therefore, the edge portions will be joined and the edges thereof covered by the stitching.

In uniting the collarette strip to the neck of a garment, the collarette strip is folded between its side edges so that the edge portions are superposed. These superposed edge portions are trimmed and stitched to the neck of the garment by stitching. By shifting the collarette relative to the trimming point, the ends thereof may be tapered, thus shaping the collarette as it is stitched to the garment.

Referring more in detail to the drawings, I have embodied my invention in a sewing machine which is provided with the usual bed plate 1, carrying a standard 2, supporting an overhanging arm 3, in which the needle bar 4 reciprocates. This needle bar carries two needles 5 and 6. The needle bar is reciprocated by a lever 7 through a pitman or eccentric rod 8 which coöperates with an eccentric on the main shaft 9. Coöperating with the needles beneath the work support is a looper 10, which is mounted on a looper carrier 11 and this looper carrier is oscillated by a link 12 which is connected to the needle lever extension 13. The looper carrier is pivotally mounted on a looper support 14, and this looper support is oscillated for giving the usual needle avoiding movements to the looper. The looper coöperates with both needles and, therefore, the looper thread joins the needle loops beneath the material.

The material to be stitched is carried by a work support 15 which is provided with a throat plate 16. This throat plate has two needle openings 17 and 18 for the needles 5 and 6, respectively. Between the needle openings is a stitch supporting tongue 19. The throat plate is formed with slots 20 which receive the feeding devices. These feeding devices include a feed bar 22 which is reciprocated from the usual feed rocker and is raised and lowered by an eccentric 23 on the shaft 9. A differential feeding mechanism is preferably used wherein one feed dog is in advance of the other and has a different movement relative thereto. The material is held on the work support by a presser foot 24 which is carried by a presser bar 25. This presser foot is formed with the needle openings 26 and also with a slot 27, which leads from the front end of the presser foot and terminates in advance of the needle opening.

Coöperating with the needles above the work support is a cross thread laying mechanism which includes a fixed guide 28 carried by a suitable lug mounted on a bracket 29 which is supported by the presser bar. Coöperating with this fixed thread guide is a thread hook 30 which is pivoted at 31 to the bracket 29. The shank of the thread hook is provided with an arm 32 which is connected by a link 33 to a lever 34. This lever 34 is pivoted to the bracket 29 and the outer end of the lever is connected to a link 35 which is attached to an arm 36 depending from a shaft 37 carried by suitable bearings in the overhanging arm. The shaft is oscillated by means of a pitman or eccentric rod 38 which coöperates with an eccentric on the main shaft. This serves as a means for oscillating the hook so that it crosses the line of feed and engages the cross thread after which the hook returns, forming a loop in the cross thread which is entered by the needle farthest from the fixed thread guide. In this manner the cross thread is looped about the two needle threads, connecting the same on the upper surface of the material.

The trimming mechanism consists of a stationary trimming blade 39 which is fixed to the presser foot and a movable trimming blade 40 which coöperates with said stationary trimming blade. This movable blade 40 is carried by an arm 41 which is fixed to a sleeve 42 and this sleeve 42 carries an arm 43 which is connected to a link 44. The link 44 is pivotally connected to an arm 45 mounted on a shaft 46 and this shaft 46 is oscillated by a pitman 47 coöperating with an eccentric on the main shaft.

Figure 7:
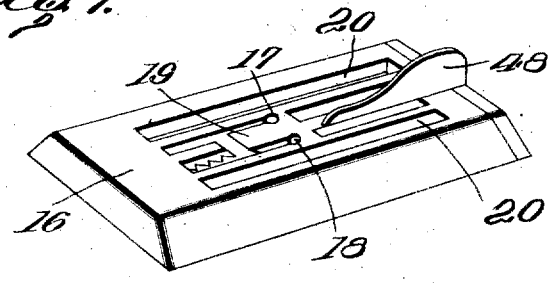
Fig. 7 is a perspective view of the throat plate.
Figure 5:
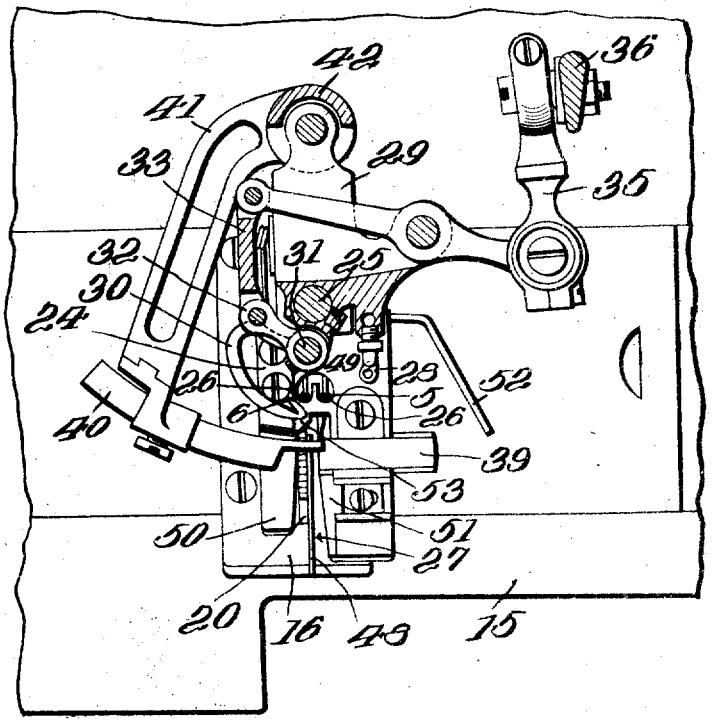
Fig. 5 is a view partly in horizontal section and partly in plan through the supporting bracket for the trimming mechanism.
Figure 6:
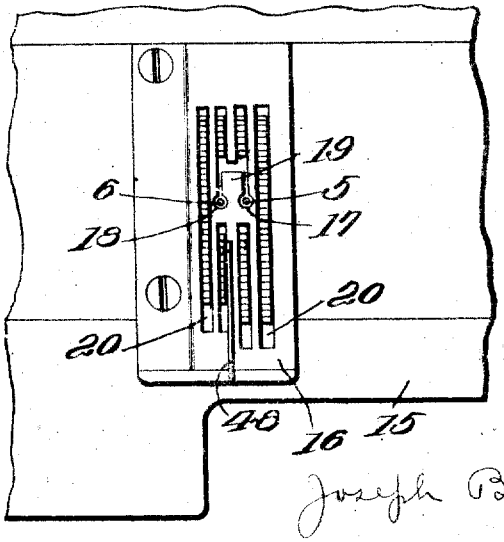
Fig. 6 is a plan view showing a part of the work support and the throat plate.
Figure 13:
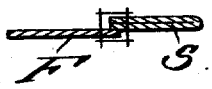
Fig. 13 is a diagrammatic view in transverse section showing the collarette strip and the body fabric united.
Figure 8:
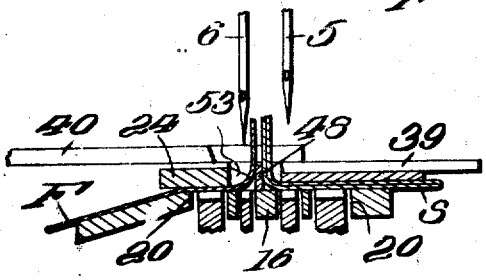
Fig. 8 is a transverse sectional view just in front of the trimmers.
Figure 9:
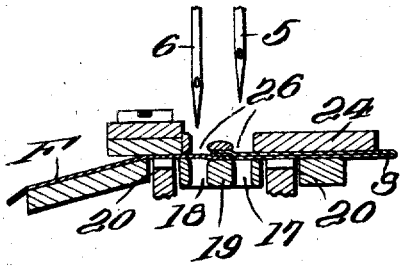
Fig. 9 is a transverse sectional view just in front of the stitching mechanism.
Figure 10:
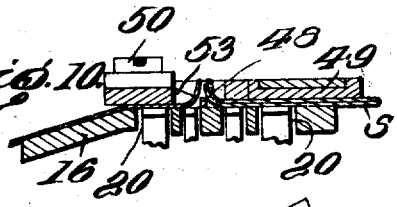
Fig. 10 is a transverse sectional view on a line just in rear of the trimming mechanism.

Mounted on the throat plate is a vertical fin 48 which extends into the slot 27 in the presser foot. This fin is tapered toward the rear end thereof, as clearly shown in Fig. 7 and the rear lower end extends underneath the trimming blade but terminates directly in rear thereof. The presser foot is formed of a fixed section 49 and a yielding section 50. The front portion of the yielding section 50 is capable of lateral adjustment toward and from the fin 48. The fixed section 49 is provided with an adjustable portion 51 which may be moved toward and from the fin 48. This adjustable feature of the presser foot provides a means for varying the width of the slot into which the fin extends and on either side of the fin.

Figure 11:
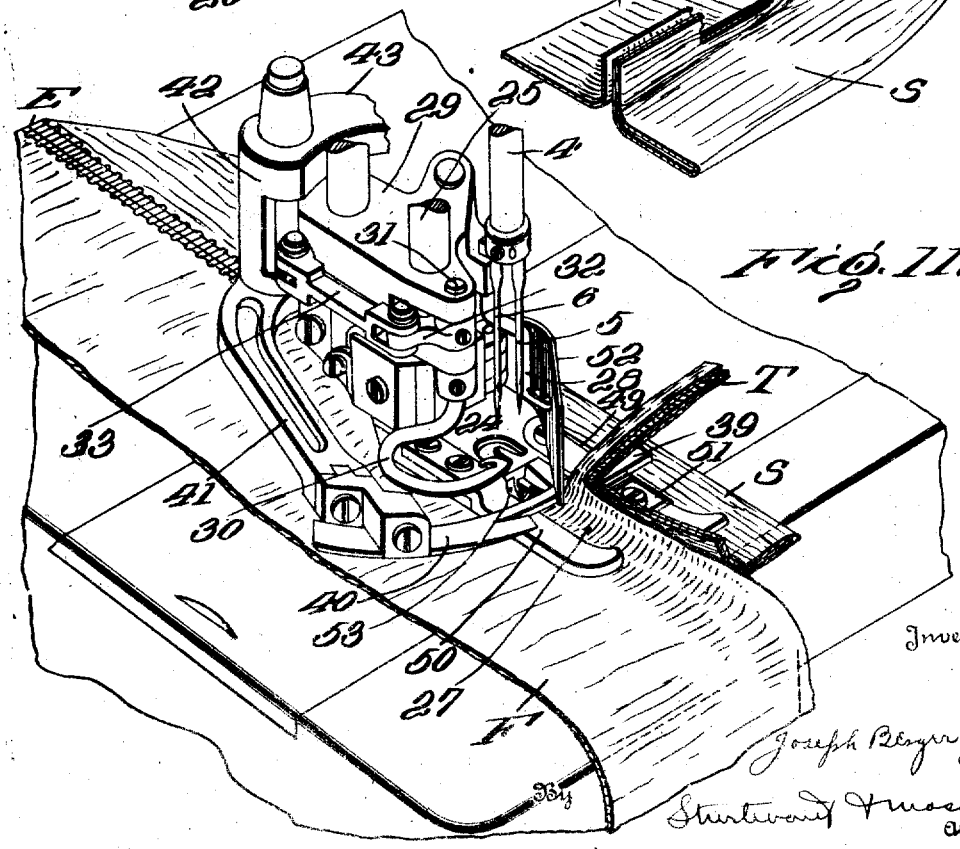
Fig. 11 is a perspective view showing a part of the stitching mechanism, the cross thread laying mechanism and the trimming mechanism and also the work support.

In Fig. 11 of the drawings I have shown a collarette strip being stitched to the neck of a garment. The collarette strip is indicated at S while the garment is indicated at F. The collarette strip is folded intermediate its side edges and the edge portions thereof are superposed. These edge portions are turned up out of the plane of the collarette strip and together with the upturned edge portion of the body fabric F are led into the slot 27. The trimmer trims these upturned edge portions and the trimmed off portions indicated at T, are deflected away from the stitching mechanism by a strip deflector 52.

Figure 12:
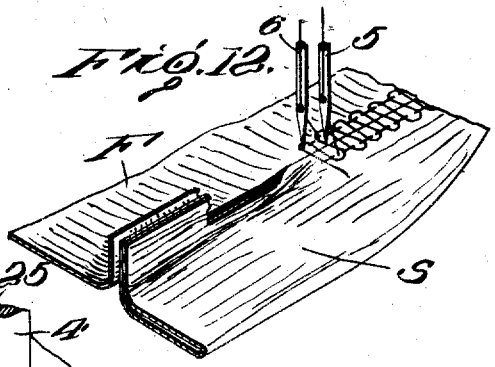
Fig. 12 is a perspective view showing more or less diagrammatically the manner of placing the edge portions and trimming the same, returning said edge portions to normal position and joining the same by stitching.

The presser foot is provided with a guide 53 which projects laterally therefrom into the slot 27 and this guide 53 is shaped so as to force the upturned trimmed edge of the body fabric F back into the plane of the body fabric and underneath the upturned portions of the collarette strip. The slot 27, as will be noted, terminates in front of the needles and the rear end of this slot turns down the edge portion of the collarette strip onto the turned down portion of the body fabric and these trimmed edge portions are overlapped, as clearly shown in Fig. 12 of the drawings. The trimming blades are arranged at a proper distance above the throat plate so that when the edges are turned down and overlapped said edges will still be within the limits of the stitching mechanism, that is, pass between the needles so that the needle 5 will pass through the collarette strip only, while the needle 6 passes through the body fabric only. The cross thread and the looper thread join the needle threads and unite the collarette strip and the neck portion of the garment and these stitching threads not only unite the fabric sections but cover the trimmed edges thereof.

As clearly shown in Fig. 11, the collarette strip has been tapered. The end of the collarette strip is indicated at E. As this end is presented to the trimming mechanism it is raised so that the trimming members begin to trim the strip at the fold therein. The strip is gradually lowered as the stitching proceeds and this results in tapering the end of the strip. When the other end of the collarette strip is reached it will be again raised and the end thereof tapered.

It is obvious that the invention in its broadest aspects, is not limited to horizontally disposed trimming members and edge turning devices for manipulating the edge portions of the fabric sections, but the essential feature of the invention consists in any arrangement of trimming devices which will accomplish the broad result of producing a flat seam, wherein the trimmed edge portions will overlap with the trimmed edges thereof terminating within the limits of the stitching mechanism, whereby said overlapped edge portions will be joined and both trimmed edges will be covered by the stitching threads. It will also be apparent that in the specific embodiment of the invention illustrated, this trimming of the edge portions may be brought about by horizontally disposed trimming members arranged a certain distance above the work support and with devices for bringing the edge portions of the fabric sections into the range of the trimming mechanism and for bringing said edge portions to overlapped relation. The position of the trimmed edges, that is, the extent of overlap, is determined by the position of the trimming devices.

When one of the fabric sections is of two thicknesses, as in the case of a collarette strip, then the portion 51 of the foot is adjusted a sufficient distance away from the fin to accommodate the double thickness of the material.

It will also be noted that the throat plate is raised above the work support and this gives sufficient clearance for the easy manipulation of the fabric sections which are being stitched.

It is obvious that minor changes in the details of construction may be made without departing from the spirit of the invention as set forth in the appended claims.

Having thus described the invention, what is claimed as new is:—

1. The combination of stitching mechanism adapted to form covering stitches, a trimming mechanism located in advance of the stitching mechanism for trimming the edges of fabric sections to be united, means for directing the fabric sections to the trimming mechanism with the edge portions turned out of the plane of the fabric sections, and means located between the trimming mechanism and the stitching mechanism for returning the trimmed edge portions to the plane of the fabric sections and with the trimmed edge portions overlapped and within the limits of the stitching mechanism whereby said overlapped edges will be joined and covered by stitching.

2. The combination of stitching mechanism adapted to form covering stitches, a work support, a presser foot having a needle opening, and a slot in advance of the needle opening leading from the front of the presser foot, a horizontal trimming mechanism including a movable blade crossing the said slot whereby upturned edge portions of fabric sections leading through said slot will be trimmed, said presser foot having means in rear of the trimming mechanism for overlapping the trimmed edge portions within the limits of the stitching mechanism whereby said overlapped trimmed edge portions will be joined and covered by stitching.

3. The combination of stitching mechanism adapted to form covering stitches, a work support, a presser foot having a needle opening and a slot in front thereof opening at the front of the presser foot, a fin on the work support extending into said slot, a horizontal trimming mechanism including a movable blade crossing said slot whereby upturned edges of fabric sections directed into said slot by said fin will be trimmed, said presser foot having means for positively forcing one of said trimmed edge portions underneath the other whereby said edge portions will be overlapped within the limits of the stitching mechanism so that said edge portions will be joined and covered by stitching.

4. The combination of stitching mechanism adapted to form covering stitches, a work support, a presser foot having a needle opening and a slot in advance of the needle opening leading to the front of the presser foot, a horizontal trimming mechanism including a movable blade crossing said slot whereby the upturned edges of fabric sections leading through said slot will be trimmed, a guide carried by the presser foot and extending into said slot, said guide being disposed so as to crowd one of the trimmed edge portions underneath the other whereby said edge portions may be returned to the plane of the fabric sections in overlapped relation.

5. The combination of stitching mechanism adapted to form covering stitches, a work support, a presser foot having a needle opening and a slot in advance of the needle opening leading to the front of the presser foot, a horizontal trimming mechanism including a movable blade crossing said slot whereby the upturned edges of fabric sections leading through said slot will be trimmed, a guide carried by the presser foot and extending into said slot, said guide being disposed so as to crowd one of the trimmed edge portions underneath the other whereby said edge portions will be returned to the plane of the fabric sections in overlapped relation, said trimming blades being disposed a distance above the work support so that the overlapped portions will lie within the limits of the stitching mechanism whereby said fabric sections will be trimmed, and the trimmed edges covered by stitching.

6. The combination of stitching mechanism adapted to form covering stitches, a work support, a presser foot having a needle opening and a slot in advance of the needle opening leading to the front of the presser foot, said presser foot being adjustable whereby the width of the slot may be varied, a horizontal trimming mechanism including a movable blade crossing said slot whereby the upturned sections of the fabric sections leading through said slot will be trimmed, and means carried by the presser foot in rear of the movable trimming blade for overlapping the trimmed edge portions within the limits of the stitching mechanism whereby said overlapped trimmed edge portions will be joined and covered by stitching.

7. The combination of stitching mechanism adapted to form covering stitches, a work support, a presser foot having a needle opening and a slot in advance of the needle opening leading to the front of the presser foot, a fin on the work support extending into said slot, said presser foot being adjustable for varying the width of the slot, a horizontal trimming mechanism including a movable blade crossing said slot whereby the upturned edges of the fabric sections leading through said slot will be trimmed, said presser foot having means in rear of the trimming mechanism for overlapping the trimmed edge portions within the limits of the stitching mechanism whereby said overlapped trimmed edge portions will be joined and covered by stitching.

8. The combination of stitching mechanism including spaced needles, a cross thread laying mechanism, and a threaded looper coöperating with both needles whereby covering stitches are formed, a work support, a presser foot having a needle opening, and a slot in front thereof opening to the front of the presser foot, a fin on the work support extending into said slot, a horizontal trimming mechanism including a movable blade crossing said slot whereby the upturned edges of fabric sections leading through the said slot will be trimmed, said presser foot having means in rear of the trimming mechanism for overlapping the trimmed edge portions within the limits of the stitching mechanism whereby said overlapped trimmed edge portions will be joined and covered.

9. The combination of a stitch forming mechanism, a feeding mechanism, a work support, a presser foot having a needle opening and a slot extending rearwardly from the front end thereof to a point in advance of said opening, a horizontal trimming mechanism including a movable blade crossing said slot, whereby upturned edge portions of fabric sections fed rearwardly along said slot will be trimmed, and means disposed between the point of trimming and the stitch forming mechanism for positively guiding the trimmed edge portions into the general plane of the fabric sections and in overlapped relation.

10. The combination of a stitch forming mechanism, a feeding mechanism, a work support, a presser foot having a needle opening and a slot extending rearwardly from the front end thereof to a point in advance of said opening, a horizontal trimming mechanism including a movable blade crossing said slot, whereby upturned edge portions of fabric sections fed rearwardly along said slot will be trimmed, and separate means disposed between the point of trimming and the stitch forming mechanism for positively guiding the trimmed edge portions into the general plane of the fabric sections and in overlapped relation.

11. In a sewing machine for forming a covered lap seam, the combination with a work support, a feeding mechanism, a stitching mechanism including a plurality of needles, complemental stitch forming mechanism for joining the needle thread loops beneath the work support, a cross thread laying mechanism coöperating with the needles above the work support, and a mechanism in advance of the stitching mechanism for trimming the edge portions of the fabric sections, said mechanism for trimming the edge portions of the fabric sections being disposed and arranged so that the trimmed edge portions will overlap with the trimmed edges thereof terminating within the limits of the stitching mechanism, whereby said overlapped edge portions will be joined and both trimmed edges thereof will be covered by the concatenated threads of the stitching mechanism, said feeding mechanism operating to feed the trimmed edge portions past the stitching mechanism.

12. In a sewing machine for forming a covered lap seam, the combination with a work support, a feeding mechanism, a stitching mechanism including a plurality of needles arranged in a plane at substantially right angles to the line of feed, a single threaded looper coöperating with the needles beneath the work support, a cross thread mechanism for laying a single cross thread coöperating with the needles above the work support, and a mechanism in advance of the stitching mechanism for trimming the edge portions of the fabric sections, said mechanism for trimming the edge portions of the fabric sections being disposed and arranged so that the trimmed edge portions will overlap with the trimmed edges thereof terminating within the limits of the stitching mechanism, whereby said overlapped edge portions will be joined and both trimmed edges thereof will be covered by the concatenated threads of the stitching mechanism, said feeding mechanism operating to feed the trimmed edge portions past the stitch forming mechanism.

In testimony whereof I affix my signature.

JOSEPH BERGER, Jr.